United States Patent [19]

Liberman

[11] 3,734,436
[45] May 22, 1973

[54] CLIP FOR ATTACHING POWER DUCTS TO T-BARS

[76] Inventor: Milton Liberman, 65 Seawane Road, East Rockaway, N.Y. 11693

[22] Filed: June 24, 1971

[21] Appl. No.: 156,322

[52] U.S. Cl. ............... 248/58, 248/68 R, 248/317, 248/343, 52/484
[51] Int. Cl. ............................................. F16l 3/00
[58] Field of Search ............... 248/58, 59, 68, 317, 248/343; 52/484

[56] References Cited

UNITED STATES PATENTS

| | | | |
|---|---|---|---|
| 2,463,047 | 3/1949 | Naysmith | 248/343 X |
| 2,734,126 | 2/1956 | Kruger | 248/343 X |
| 3,275,817 | 9/1966 | Schwartz | 248/343 X |
| 3,558,091 | 1/1971 | Bush | 248/317 |
| 2,984,447 | 5/1961 | Duvall | 248/317 |

FOREIGN PATENTS OR APPLICATIONS

| | | | |
|---|---|---|---|
| 324,998 | 10/1957 | Switzerland | 52/484 |
| 349,057 | 9/1960 | Switzerland | 52/484 |
| 335,558 | 1/1959 | Switzerland | 52/484 |

Primary Examiner—Roy D. Frazier
Assistant Examiner—Rodney H. Bonck
Attorney—Eugene E. Geoffrey, Jr.

[57] ABSTRACT

A clamp for supporting prewired ducts above a drop ceiling, the clamp having means for attachment to a supporting surface and to structural members of the drop ceiling and means for releasably engaging and supporting a prewired duct.

4 Claims, 3 Drawing Figures

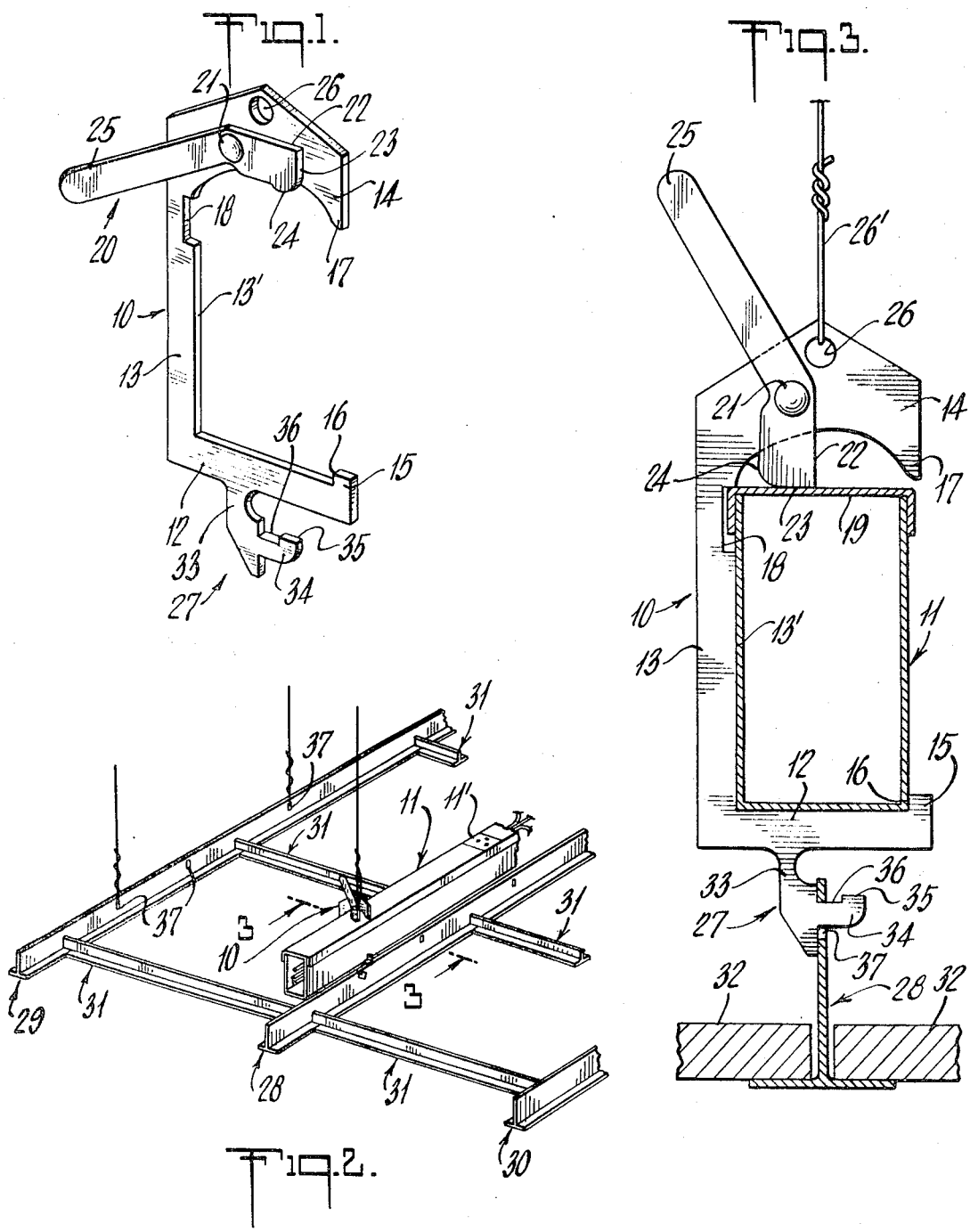

CLIP FOR ATTACHING POWER DUCTS TO T-BARS

This invention relates to drop ceilings utilizing inverted T-bars for the support thereof and more specifically to novel and improved means for integrating conduits or ducts therewith for power distribution, communication systems and the like.

The so-called "drop ceiling" is widely used in commercial and residential buildings to accommodate recessed lighting fixtures, air conditioning and heating ducts and cables for energy distribution, communication systems and the like. In connection with cable installation and particularly cables for power distribution, the basic wiring had to be accomplished prior to the installation of the ceiling and suitable outlet boxes had to be installed in the vicinity of the proposed positions for the lighting fixtures. After installation of the ceiling, each fixture had to be wired to the nearest box with the result that the lighting fixture installation was both time consuming and costly.

This invention provides novel and improved means for use with conventional T-bar ceiling installations for the releasable support of elongated prewired power ducts embodying outlets spaced along the length thereof for energizing the light fixtures. The use of prewired ducts merely necessitates the provision of an energy supply along one wall of a room or area so that energy can be fed to one end of each duct. The improved releasable support is provided with means for engaging and supporting a T-bar and has means for attaching it to the supporting surface. After installation of the supports in an existing ceiling or new ceiling, as the case may be, the ducts are merely placed in the supports and locked in position.

Another object of the invention resides in a novel and improved device for use in drop ceiling installations for releasably supporting prewired ducts for the distribution of electrical energy, communication systems and the like.

The above and other objects and advantages of the invention will become more apparent from the following description and accompanying drawings forming part of this application.

IN THE DRAWINGS

FIG. 1 is a perspective view of one embodiment or duct supporting means in accordance with the invention, FIG. 2 is a side elevational view of the supporting means of FIG. 1 in position in a drop ceiling with a duct clamped therein, and FIG. 3 is a perspective view of a drop ceiling showing a prewired duct and supporting means therefor.

As previously pointed out, drop or suspended ceilings generally utilize inverted T-shaped elements or T-bars supported by wires or rods secured to a supporting surface of a building. The T-bars are positioned in predetermined spaced relationship both longitudinally and laterally and are interlocked to provide openings for ceiling tiles and recessed lighting fixtures, as generally shown in FIG. 3. In order to provide electrical energy, conduits or BX cable with outlet boxes at each lighting fixture location have been used. Similarly, electric wiring for communication and other purposes was also installed and fixed to the structure of the building prior to the ceiling installation. This requirement for extensive electric wiring on location which is both time consuming and costly is eliminated or minimized by utilizing prewired ducts integrated with the drop ceiling by the use of novel and improved duct-carriers along the length of a T-bar, the duct is placed in engagement with the clamps and locked therein.

Referring to the drawings, and more specifically to FIGS. 1 and 2, the duct-carrying clamp is generally denoted by the numeral 10 and is arranged to carry a duct 11 of generally rectangular cross section though it is understood that the clamp can be arranged to accommodate ducts of other configurations.

The clamp 10 is in the shape of a 'C' having bottom, side and top members or legs 12, 13 and 14 respectively forming a rectangular opening. The bottom member has an upwardly extending portion 15 forming a shoulder 16. The distance between the shoulder 16 and the inner edge 13' of the member 13 is at least equal to the width of the duct 11 and the distance between the top surface of the portion 15 and the outer edge 17 of the top member 14 is slightly greater than the height of the duct 11.

The upper leg 14 of the clamp includes latching means generally denoted by the numeral 20 and pivoted to the leg 14 at 21. The right end 22 of the latch as shown in FIG. 1 has a flattened end portion 23 and a rounded portion 24. The left portion 25 is in effect a handle to rotate the latch from the position shown in FIG. 1 to the position shown in FIG. 2 to lock the duct 19 therein. It will be observed in FIG. 2 that the rounded end portion 24 prevents abrasion of the cover during the locking operation and the flattened portion 23 maintains the latch in the locked position.

The upper portion or leg 14 of the clamp includes an opening 26 for attachment of a wire 26' or other support for attachment of the clamp to the ceiling or other support surface. The lower leg 12 of the clamp includes a downwardly depending hook generally denoted by the numeral 27 for engagement of a conventional T-bar 28, the latter in combination with adjoining T-bars 29 and 30 and transverse T-bars 31 functions to support ceiling tiles 32 and lighting fixtures in the usual manner.

More specifically, the hook 27 includes a downwardly extending portion 33 and an outwardly extending portion 34, the latter terminating in an upwardly extending portion 35 to form a hook-like recess 36. The hook 27 engages an opening 37 in the T-bar 28 so that the clamp supports both the T-bar as well as the duct 11. By the use of a plurality of clamps 10 along the length of a T-bar such as T-bar 28, the duct 11 will be firmly supported and may extend throughout the length or width of the drop ceiling as the case may be. By the provision of a plurality of spaced prewired ducts 11 each having outlets 11' spaced along the length thereof, electric cables for the supply of energy need merely be connected to one end of each of the ducts and individual electric outlet boxes for each lighting fixture are not required. Thus, lighting fixtures having cables and plugs can be positioned at any desired locations in the ceiling and then plugged into the nearest duct outlet.

From the foregoing description it is evident that the novel and improved clamp can be utilized for the installation of prewired ducts in new drop ceilings as well as in existing ceilings should it be desired to change or rearrange the lighting.

While only one embodiment of the invention has been illustrated and described, it is apparent that alterations, modifications and changes may be made without departing from the true scope and spirit thereof as defined by the appended claims.

What is claimed is:

1. Means for supporting electrical ducts above a drop ceiling utilizing horizontally disposed members secured to a supporting surface comprising a plurality of duct supporting structures each having means on the bottom thereof for attachment to a horizontally disposed member, means on the upper side thereof for attachment to said supporting surface and means for releasably engaging and supporting a duct, each of said duct supporting structures comprising a substantially horizontal bottom leg, a vertical leg extending upwardly from one end of said horizontal leg and a top leg extending outwardly from the upper end of said vertical leg and in the same direction as said bottom leg, a hook like member secured to and extending downwardly from said bottom leg, means on said top leg for securing said structure to said supporting surface and means pivoted to one of said legs for engaging and securing said duct within the opening defined by said legs.

2. Means for supporting electrical ducts according to claim 1 wherein the other end of said bottom leg includes an upwardly extending portion to hold the bottom of a rectangular duct in position on said bottom leg and said pivoted means comprises a lever pivoted to said top leg and having a portion movable from a horizontal unlocked position to a vertical position bearing against the top side of said duct to secure said duct in position in said structure.

3. A device for supporting a prewired duct above a drop ceiling comprising a generally C-shaped bracket, hook-like means extending from the bottom thereof for engagement with a structural member of said drop ceiling, means on the top of said bracket for attaching it to a supporting surface and means for releasably securing a duct within said bracket, said bracket being of generally rectangular configuration having a bottom, side and top leg, said bottom leg includes means for receiving and holding the bottom of a rectangular duct and a depending hook-like member and said top leg includes an opening and a latch pivoted thereto and movable into engagement with the top of said duct to secure the duct in position in said bracket.

4. A device according to claim 3 wherein said latch is in the form of a lever pivoted at a point between the ends thereof to said top leg.

* * * * *